US008585867B2

(12) United States Patent
Antal, Jr.

(10) Patent No.: US 8,585,867 B2
(45) Date of Patent: Nov. 19, 2013

(54) PROCESS FOR IGNITION OF BIOMASS FLASH CARBONIZATION

(75) Inventor: Michael J. Antal, Jr., Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 763 days.

(21) Appl. No.: 12/679,635

(22) PCT Filed: Sep. 24, 2008

(86) PCT No.: PCT/US2008/077436
§ 371 (c)(1),
(2), (4) Date: Mar. 23, 2010

(87) PCT Pub. No.: WO2009/042633
PCT Pub. Date: Apr. 2, 2009

(65) Prior Publication Data
US 2010/0193344 A1    Aug. 5, 2010

Related U.S. Application Data

(60) Provisional application No. 60/995,513, filed on Sep. 26, 2007.

(51) Int. Cl.
*C10B 49/02*    (2006.01)
(52) U.S. Cl.
USPC ................................. 201/25; 201/35; 201/36
(58) Field of Classification Search
USPC .......... 201/36, 35, 25; 202/85, 91, 93, 96, 97, 202/99, 108, 110, 121, 211, 213, 266; 110/229
See application file for complete search history.

(56) References Cited

U.S. PATENT DOCUMENTS

| 1,092,018 | A | * | 3/1914 | Castona ........................ 202/266 |
| 4,385,905 | A | | 5/1983 | Tucker |
| 4,530,702 | A | | 7/1985 | Fetters et al. |
| 5,290,523 | A | | 3/1994 | Koppelman |
| 5,435,983 | A | | 7/1995 | Antal, Jr. |
| 5,551,958 | A | | 9/1996 | Antal, Jr. |
| 6,790,317 | B2 | * | 9/2004 | Antal, Jr. ........................ 201/35 |

FOREIGN PATENT DOCUMENTS

| WO | WO 98/51434 | 11/1998 |
| WO | WO 03/002690 | 1/2003 |
| WO | WO 2009/042633 | 4/2009 |

OTHER PUBLICATIONS

Antal, M.J. et al., "Cellulose Pyrolysis Kinetics: the Current State of Knowledge," Ind.Eng.Chem.Res., vol. 34, No. 3 (1995), pp. 703-717.
Antal, M.J. et al., "Cellulose Pyrolysis Kinetics: Revisited," Ind.Eng. Chem.Res., vol. 37, No. 4 (1998), pp. 1267-1275.

(Continued)

*Primary Examiner* — Jill Warden
*Assistant Examiner* — Joye L Woodard
(74) *Attorney, Agent, or Firm* — Weaver Austin Villeneuve & Sampson LLP

(57) ABSTRACT

A low-energy input process for the pyrolytic conversion of biomass to charcoal or carbonized charcoal is provided. The biomass is sealed in a container, pressurized, then air is introduced at the proximal end of the container and released at the distal end of the container. The biomass is ignited by a heater at the distal end. The operation of the heater is halted after initial ignition and the biomass is allowed to continue to burn in a proximal-to-distal end airflow to finish the conversion.

9 Claims, 1 Drawing Sheet

(56) References Cited

OTHER PUBLICATIONS

Antal, M. J. et al., "Attainment of the theoretical yield of carbon from biomass," Ind.Eng.Chem.Res., vol. 39, No. 11 (2000), pp. 4024-4031.

Antal, M. J. et al., "High-Yield Biomass Charcoal," Energy Fuels, vol. 10, No. 3 (1996), pp. 652-658.

Mok, William S.-L. et al., "Effects of pressure on biomass pyrolysis; II. Heats of reaction of cellulose pyrolysis," Thermochimica Acta, vol. 68, Nos. 2-3 (1983), pp. 165-186.

Smith, K.R. et al., "Greenhouse Gases from Small-Scale Combustion Devices in Developing Countries: Charcoal-Making Kilns in Thailand," EPA Report No. EPA-600/R-99-109, Office of Air and Radiation and Policy and Program Evaluation Div.: Washington, D.C. (1999), 1 pg.

WO International Search Report dated Sep. 30, 2002 issued in PCT Application No. PCT/US2002/020689.

WO International Preliminary Examination Report dated Jan. 29, 2004 issued in PCT Application No. PCT/US2002/020689.

US Notice of Allowance dated Jan. 5, 2004 issued in U.S. Appl. No. 10/152,276.

US Office Action dated Feb. 10, 2005 issued in U.S. Appl. No. 10/815,581.

US Final Office Action dated Aug. 9, 2005 issued in U.S. Appl. No. 10/815,581.

US Office Action dated Mar. 13, 2006 issued in U.S. Appl. No. 10/815,581.

US Final Office Action dated Aug. 4, 2006 issued in U.S. Appl. No. 10/815,581.

WO International Search Report dated Dec. 3, 2008 issued in PCT Application No. PCT/US2008/077436.

WO Written Opinion dated Dec. 3, 2008 issued in PCT Application No. PCT/US2008/0774386.

WO International Preliminary Report on Patenability dated Mar. 30, 2010 issued in PCT Application No. PCT/US2008/0774386.

EP Supplementary European Search Report dated Mar. 18, 2010 issued in Application No. 02748015.1.

AU Office Action dated Nov. 16, 2006 issued in Application No. 2002318452.

CA Office Action dated Apr. 3, 2009 issued in Application No. 2,451,894.

JP Office Action dated Dec. 25, 2007 issued in Application No. 2003-509053.

* cited by examiner

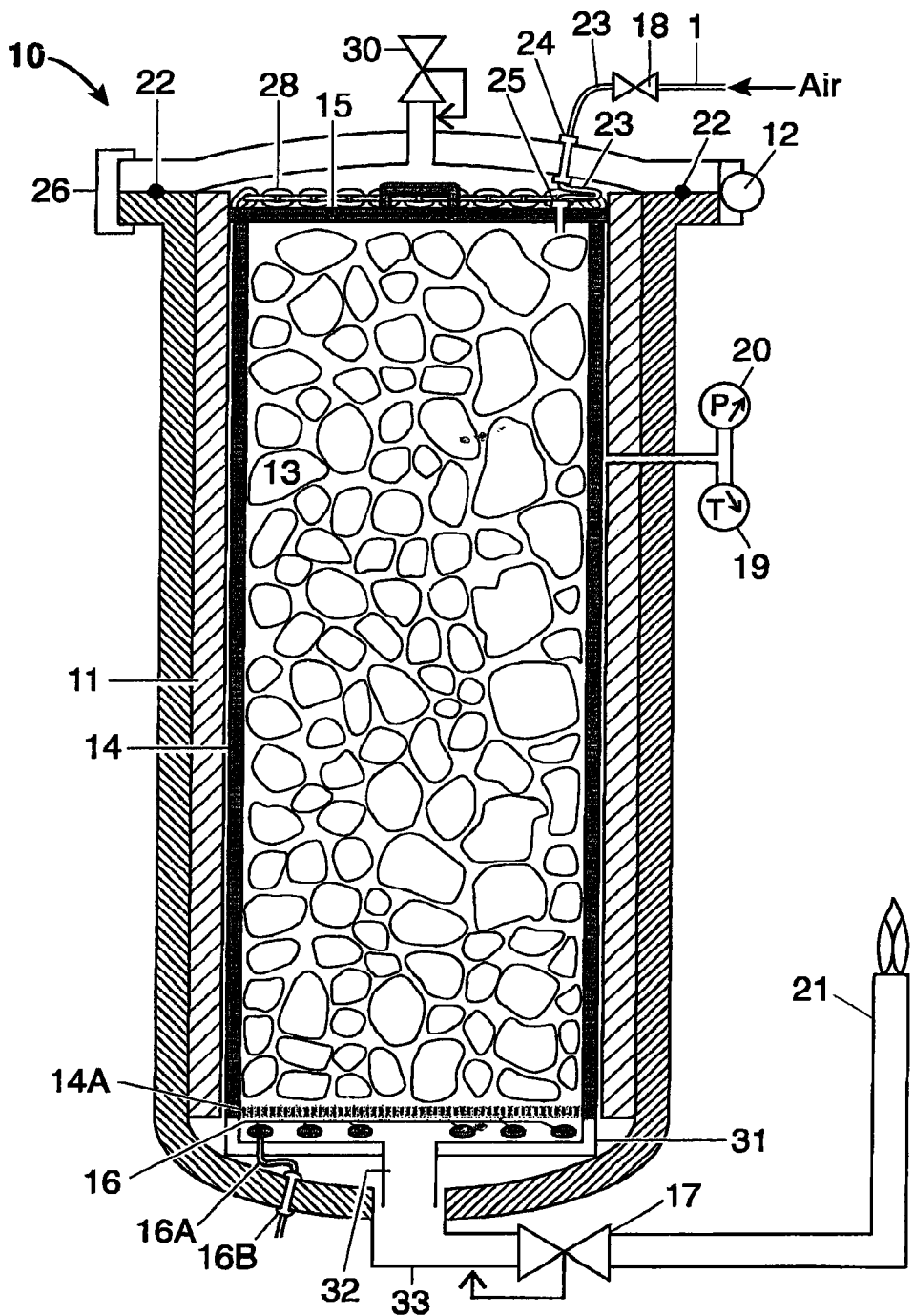

PROCESS FOR IGNITION OF BIOMASS FLASH CARBONIZATION

RELATED APPLICATION

This application is related to International Application No. PCT/US2008/077436 filed on Sep. 24, 2008. the priority of which is claimed pursuant to 35 USC 120 and 365. The prior application claims the benefit of U.S. Provisional Application No. 60/995,513, filed Sep. 26, 2007, under 35 USC 119 and 363. Both applications are incorporated herein by reference in their entirety.

FIELD OF THE INVENTION

This invention relates to the production of charcoal from biomass.

BACKGROUND OF THE INVENTION

The term "biomass" includes many types of woody and herbaceous plant material, such as wood logs, slabs, chips, and bark; and agricultural residues such as corncobs, corn stover, sunflower shells and husks, nutshells, olive cake, and sugar cane bagasse. Biomass may also include the organic fraction of municipal solid wastes (including rubber tires), sewage sludge, manure, or other excrement, and the residues of animal husbandry, such as bones and carcasses. The term "inert" in the context of the present invention means that such compound, composition or material does not react with biomass, or its byproducts of pyrolysis, at temperatures and pressures attained within the reaction container in the practice of the present invention.

Charcoal is a carbonaceous solid with a fixed-carbon content of about 70 wt % or more. Charcoal is usually manufactured from hardwoods by pyrolysis in large kilns or retorts at temperatures below about 500° C. When charcoal is heated ("carbonized") in an inert environment to temperatures typically above 800° C., it loses most of its remaining volatile matter and becomes a nearly pure carbon with a fixed-carbon content of 90 wt % or more. As used herein, the term "biocarbon" represents both charcoal and carbonized charcoal. Biocarbons possess many unique properties. Both charcoal and carbonized charcoal contain virtually no sulfur or mercury. Relative to their fossil fuel cousins, these biocarbons are very low in nitrogen and low in ash. Consequently, many carbonized charcoals are purer forms of carbon than most graphites. Unlike coking coals, pitches, crude resids, and other fossil carbon precursors, biomass does not pass through a liquid phase during pyrolysis at low heating rates. Consequently, biocarbons are inherently porous. They are also amorphous, as evidenced by very little of a turbostratic structure in their x-ray diffraction spectra. Nevertheless, a packed bed of carbonized charcoal conducts electricity nearly as well as a packed bed of graphite particles.

In U.S. Pat. No. 6,790,317, incorporated herein by reference in its entirety, a carbonization process to produce biocarbon is disclosed. The process of the present invention is an improvement over that process that significantly reduces the conversion times to biocarbon in similarly-sized reactors.

Accordingly, an object of the present invention is to provide an improved, rapid, efficient and economical process for converting biomass into charcoal.

This and other objects and advantages to the present invention will be readily apparent upon reference to the drawing and the following description.

SUMMARY OF THE INVENTION

The present invention provides a low-energy input process for the pyrolytic conversion of biomass material into charcoal or carbonized charcoal (collectively referred to as biocarbon) and power, comprising the steps of (a) sealing the material in an enclosed container having a proximal end and a distal end, a valved air entry orifice for introducing air at the proximal end of the container and a valved gas exit orifice and heater at the distal end of the container; whereby the non-inert contents of the container consists essentially of the biomass material and air;

(b) pressurizing the container with air or oxygen, then initiating flow of air or oxygen into the container at the proximal end and out of the container at the distal end;

(c) heating the material with the heater to cause it to ignite and burn while continuing said flow of air or oxygen, then ceasing operation of the heater after ignition of the material;

(d) controlling the flow and pressure within the container in a proximal-to-distal end flow by regulating air or oxygen intake at the proximal end and exhaust of combustion gases at the distal end;

(e) continuing the flow until carbonization is complete.

A reactor is also provided for pyrolytic conversion of biomass material into charcoal and gas comprising, a housing having a proximal end, a distal end and a sealable opening for receiving a removable canister containing the material;

a valved air entry orifice for introducing air to the proximal end of the canister;

a valved gas exit orifice and heater at the distal end of the housing insulation surrounding at least a portion of the sides of the canister;

the canister being receivable in the housing such that there is minimal exposure of the contents of the canister to the atmosphere when the sealable opening is open.

DESCRIPTION OF THE DRAWING

The accompanying FIGURE is a cross-section elevational view of a preferred apparatus for performing the process of the invention.

DESCRIPTION OF THE PREFERRED EMBODIMENT

The biomass material may be used without pretreatment, other than cutting wood to manageable sizes and shapes. Therefore, the material may have high or low moisture content. No special oven drying of the feedstock is necessary. A small amount of dry biomass, which can serve as tinder, may be loaded into the bottom of the reactor near the heater, prior to loading the moist biomass. This tinder may shorten the time and reduce the external energy input required to kindle the biomass.

Although air is the preferred gas oxidizer, mixtures of air with oxygen, or pure oxygen can be employed to speed ignition. To use the reactor, a canister having a cavity to accommodate the heating element is filled with biomass and placed in the reactor. After pressurizing and introducing an airflow and ignition, cessation of heating for ignition, pyrolysis, and pressure release, if necessary, the canister of hot biocarbon is lifted out of the reactor and another canister of biomass is inserted into the reactor. The reactor is positioned vertically (proximal end up), for optimal air flow.

The typical turn-around time is significantly improved compared to the process disclosed in U.S. Pat. No. 6,790,317.

The biocarbon made in accordance with the present invention typically has a volatile matter content of less than about 15 wt %, and a calorific value of about 33 MJ/kg.

There are two classes of biomass feedstocks: those that are energetic and those that are highly energetic. Energetic feedstocks (e.g. macadamia nutshells) are dense (i.e. not porous), hard, and relatively moist, having a moisture content (moist basis) typically about 10% or higher. Highly energetic feedstocks (e.g. leucaena wood, oak wood, and corncobs) are porous and dry, having a moisture content (moist basis) typically below about 10%. According to the present invention, highly energetic feedstocks manifest sudden pressure surges during ignition, but biocarbon is produced advantageously with very short reaction times. While reaction times using energetic feedstocks are generally longer, an advantage is that a biocarbon yield is attainable that can be higher than that disclosed in U.S. Pat. No. 6,790,317.

The pressure attained within the reactor during the conversion will usually be less than about 400 psig (pounds/square inch @ gauge). The pressure used within the reactor will generally be higher for energetic feedstocks, such as macadamia nutshells, than for highly energetic feedstocks. For energetic feedstocks the pressures may be typically in the range of about 150-300 psig, but may vary according to the materials used. For highly energetic feedstocks, such as oak wood, lower pressures within the reactor may be sufficient. Such pressures may typically be in the range of about 100-200 psig, but may vary according to the materials used. The temperature attained within the reactor may be monitored. The type of biomass used, the attainment of ignition, and the maintenance of airflow and pressure to maintain combustion will attain the required temperature. Typically, the temperature within the reactor will be greater than about 400° C. but usually less than 900° C.

By initiating and continuing the airflow in the reactor after pressurization and prior to ignition, and continuing the airflow from the proximal end to the distal end of the reactor, where the heating for ignition occurs at the distal end, improvement of the reaction times to completion may be achieved in the case of highly energetic feedstocks. In the case of energetic feedstocks, biocarbon yields may be improved in accordance with the present invention.

The hot exhaust gas that leaves the reactor at elevated temperature may be delivered to a steam or gas turbine, or gas engine to generate power. Because the reactor operates in a cyclic mode, the production of gas is not steady. The gas may be delivered to an insulated holding tank, where it can be stored and delivered to the turbine or gas engine at a steady temperature and pressure. Alternatively, two or more reactors may be operated sequentially in such a way that their combined gas output is steady and suitable for delivery to a turbine or gas engine. The combustible hot gas may be burned in the gas turbine or a gas engine. Alternatively, the gas can be burned in a combustor, or flare, or a catalytic afterburner.

The process of the present invention will be described hereafter in conjunction with the apparatus shown in the accompanying FIGURE. It will be realized, however, that other apparatus may be utilized by which the process parameters can be maintained and by which removal of the processed charcoal can be accomplished without exposure to air or oxygen.

Moist or dry biomass in any convenient form, such as wood logs or sawdust or rice hulls or corncobs, is loaded into the canister 14 by opening lid 15 at the proximal end (top) of the canister. The bottom of the canister 14A is preferably made from a metal screen or perforated metal to permit direct heating of the biomass or tinder and thereby to facilitate its ignition. After canister 14 is filled with biomass 13, it is loaded into reactor 10 that is a pressure vessel via a hinged closure 12 and sealed. Insulation 11 (which may simply be stagnant air) lining the inside wall of the reactor reduces loss of heat from the canister 14 during combustion and pyrolysis. An air compressor (not shown) delivers air to the reactor via line 1 through valve 18, conduit 23, coupling 24 and inlet 25. Air or oxygen-enriched air may be used. The internal pressure is typically initially raised to around 100-150 psi, then air or oxygen in flowed into the reactor at the proximal end. Electric power is then delivered via wires 16A to and feedthrough 16B to flat heaters 16 to heat the packed bed of biomass material and to cause it to ignite and combust in the downwardly flowing air environment. The flat heaters 16 are supported by footing 31, which also contains duct 32 that directs the flow of hot combustion gas into the outlet pipe 33. Tinder may be used at the bottom of canister 14 near the heaters to facilitate ignition. After ignition, the heater 16 is turned off.

A pressure regulator 17 is utilized to release gas from the distal end (bottom) of the reactor 10 and thereby control pressure and airflow within the reactor 10.

Temperatures within the reactor may be monitored by thermocouples 19. Likewise, the pressure within the reactor may be monitored by a pressure gauge 20. When ignition of the biomass occurs, the temperature and pressure within the reactor will rise quickly. Typically, the pressure will be maintained in the range of about 100-150 psi after the initial ignition pressure surge. The time required for air delivery depends upon the airflow rate and the feedstock, but is typically less than about 30 min. in a laboratory-sized reactor of a design shown in the FIGURE. Gas within the reactor is released via regulator 17 and line 21. This gas may be burned in a flare as shown, or it may be burned in an external combustor (not shown) or a catalytic afterburner (not shown) to generate heat. Alternatively, the hot gases released from the reactor via regulator 17 can be delivered to a standard steam turbine (not shown) or a gas engine (not shown) to generate power. The gas may be burned in a gas turbine (not shown) or a gas engine (not shown) to generate additional power.

The exact residence time of the solid material within the reactor will depend upon the size of the reactor, the particular type of material used and its moisture content. Typical turn-around time from pressurization, ignition, to completion of carbonization may be less than an hour in a laboratory-sized reactor as shown in the FIGURE. The optimum conditions for a particular biomass feedstock can be readily determined by anyone with ordinary skill in the art by testing samples of the particular biomass material.

It is a feature of the present invention that, to maximize efficiency, the reactor need not be cooled between loads. Gas is vented through valve 17 prior to opening the hinged closure 12 to reduce the pressure within the reactor to atmospheric pressure. Canister 14 is tight, thus minimizing entry of air into canister 14 so the hot biocarbon within the canister does not burn when the canister is lifted from the reactor. Immediately after removing a canister from the reactor 10, another canister of biomass material may be lowered into the reactor. Thereafter the reactor may be sealed, and heated again, without allowing any substantial cooling of the reactor 10, thereby making the overall process more efficient.

Referring to the FIGURE, other features of the reactor 10 include a proximal sealing gasket 22. The hinged closure 12 is secured via a lock mechanism 26. The canister 14 accommodates a chain handle 28 for the purpose of raising and lowering it into reactor 10. Safety valve 30 employs a burst diaphragm to release gas in the event of overpressure.

Comparative Example 1

Macadamia nut shells are an energetic biomass feedstock available in large quantities on the Big Island of Hawaii. A load of 3.16 kg of macadamia nut shells (13.8 wt % moisture content on a moist basis) was placed into the canister of a laboratory-scale Flash Carbonization™ reactor ("FC") designed as shown in the FIGURE. The canister was loaded into the FC reactor, and pressurized with air to 300 psig. Air delivery was initiated (0.132 kg/min) and subsequently the ignition heater was turned on. The biomass ignited and the pressure in the FC reactor rose to about 330 psi during air delivery. The FC reactor exhaust valve was opened slightly more, and the pressure fell to 300 psi where it remained for the duration of the run. The oxygen content of the effluent gas fell quickly from its usual value (21%) to 0.8% after 11 min of air delivery. The oxygen content of the effluent remained below about 2% for the duration of the run. Airflow was halted 31 minutes after the ignition heater was energized. The charcoal yield was 37.0 wt %, the fixed-carbon yield was 33.5 wt %, and the ash content of the charcoal was 1.5 wt %. Comparable results following the procedure of U.S. Pat. No. 6,790,317 were reported in a technical paper by Antal, Mochidzuki, and Paredes (*Ind. Eng. Chem. Res.* 2003, 42, 3690-3699). In this paper the macadamia nut shell charcoal yield was reported to be 34.5 wt % and the fixed-carbon yield was 30.9 wt %. Thus the ignition procedure described in this disclosure provides a significant improvement in both the charcoal yield and the fixed-carbon yield of macadamia nut shells. Also, in the technical paper by Antal et al. the reaction time was 51 min for a canister containing only 1.1 kg of macadamia nut shell material. Thus a reduction in reaction time of about 40% was realized according to the new ignition procedure, without consideration of the much larger amount of macadamia nut shell carbonized in this example.

Comparative Example 2

A load of 2.04 kg of air-dry corn cob material (9.7 wt % moisture content on a moist basis) was placed into the canister of the FC reactor. Corn cob material is a highly energetic feedstock that is widely available and well-suited to charcoal production. The canister was loaded into the FC reactor, and pressurized with air to 150 psig. Air delivery was initiated (0.132 kg/min) and subsequently the ignition heater was turned on. The corn cob biomass ignited and the pressure in the FC reactor surged to about 170 psi during air delivery. The FC reactor exhaust valve was opened further and the pressure fell to 150 psi, where it remained for the duration of the run. Airflow was halted 15 minutes after the ignition heater was energized. The charcoal yield was 27.8 wt %, the fixed-carbon yield was 23.3 wt %, and the ash content of the charcoal was 3.2 wt %. These results may be compared to EXAMPLE 4 of U.S. Pat. No. 6,790,317. This patent reports a corn cob charcoal yield of 33.1 wt % and a corn cob fixed-carbon yield of 28.0 wt % with a reaction time of 20 min. Thus the ignition procedure described in this disclosure reduced the reaction time by 25% at the price of a reduction in the charcoal and fixed-carbon yields from the highly energetic corn cob feedstock.

Comparative Example 3

A load of 2.67 kg of air-dry oak wood waste (7.6 wt % moisture content on a moist basis) from the manufacture of floorboards was placed into the canister of the FC reactor. This is exactly the same oak wood waste as was employed in EXAMPLE 3 of U.S. Pat. No. 6,790,317. Dry oak wood is a highly energetic feedstock. The canister was loaded into the FC reactor, and pressurized with air to 150 psig. Air delivery was initiated (0.132 kg/min) and subsequently the ignition heater was turned on. The oak wood biomass ignited and the pressure in the FC reactor surged to about 170 psi during air delivery. The FC reactor exhaust valve was opened further and the pressure fell to 150 psi, where it remained for the duration of the run. Airflow was halted 23 minutes after the ignition heater was energized. The charcoal yield was 27.2 wt %, the fixed-carbon yield was 24.1 wt %, and the ash content of the charcoal was 1.0 wt %. These results may be compared to EXAMPLE 3 of U.S. Pat. No. 6,790,317. This patent reports an oak wood charcoal yield of 35.1 wt % and a oak wood fixed-carbon yield of 28.0 wt % with a reaction time of 30 min. Thus the ignition procedure described in this disclosure reduced the reaction time by 23% at the price of a reduction in the charcoal and fixed-carbon yields from the highly energetic oak wood feedstock.

Comparative Example 4

A load of 1.98 kg of air-dry leucaena wood (9.2 wt % moisture content on a moist basis) was placed into the canister of the FC reactor. Leucaena wood is a highly energetic biomass feedstock. The canister was loaded into the FC reactor, and pressurized with air to 150 psig. Air delivery was initiated 0.132 kg/min) and subsequently the ignition heater was turned on. The leucaena wood ignited and the pressure in the FC reactor surged to about 170 psi during air delivery. The FC reactor exhaust valve was opened further and the pressure fell to 150 psi where it remained for the duration of the run. Airflow was halted 15 minutes after the ignition heater was energized. The charcoal yield was 27.7 wt %, the fixed-carbon yield was 23.8 wt %, and the ash content of the charcoal was 2.7 wt %. These results may be compared to EXAMPLE 2 of U.S. Pat. No. 6,790,317. This patent reports a leucaena wood charcoal yield of 40.0 wt % and a leucaena wood fixed-carbon yield of 29.7 wt % with a reaction time of 34 min. Thus the ignition procedure described in this disclosure reduced the reaction time by 59% at the price of a reduction in the charcoal and fixed-carbon yields from the highly energetic leucaena wood feedstock.

I claim:
1. A process for the conversion of biomass material into charcoal or carbonized charcoal, comprising the steps of:
   (a) sealing said material in an enclosed container having a proximal end and a distal end, a valved air entry orifice in the proximal end for introducing air at the proximal end of said container and
   a valved gas exit orifice and heater at the distal end of said container;
   whereby the non-inert contents of said container consists essentially of said material and air;
   (b) pressurizing said container with air or oxygen, then initiating a directed flow of air or oxygen into said container at said proximal end through said air entry orifice in the proximal end toward the distal end and out of said container at the distal end;

(c) heating said material with said heater to cause it to ignite and burn while continuing said flow of air or oxygen, then ceasing operation of said heater after ignition of said material;

(d) continuing said flow while controlling the flow and pressure within said container in a proximal-to-distal end flow by regulating air or oxygen intake through the air entry orifice in at said proximal end of the container and exhaust of combustion bases gases through the gas exit orifice at said distal end;

(e) continuing the proximal-to-distal end flow until carbonization of said material is complete.

2. A process according to claim 1 wherein tinder is included as part of said material sealed within said container to facilitate ignition.

3. A process according to claim 1 wherein said gas released from said container is externally recovered and burned in an external combustor.

4. A process according to claim 1 wherein said gas released from said container is delivered at elevated temperature to a catalytic afterburner.

5. A process according to claim 1 wherein said gas released from said container is delivered at elevated temperature and pressure to a steam or gas turbine or gas engine to generate power.

6. A process according to any of claims 1 through 5 further comprising the steps of (f) reducing pressure, if necessary, to attain to atmospheric pressure in said container by the release of gas from said container, and (g) removing the hot charcoal or carbonized charcoal produced without combustion by avoiding exposure to sufficient air or oxygen to avoid combustion thereof.

7. A process according to claim 1 wherein said biomass material is moist.

8. A process according to claim 1 wherein said biomass material is dry.

9. A process according to claim 1 wherein said container is vertically positioned so that said proximal end is at the top and said distal end is at the bottom.

* * * * *